United States Patent
Pekonen et al.

(10) Patent No.: US 7,092,672 B1
(45) Date of Patent: Aug. 15, 2006

(54) REPORTING CELL MEASUREMENT RESULTS IN A CELLULAR COMMUNICATION SYSTEM

(75) Inventors: Johanna Pekonen, Espoo (FI); Leif Friman, Järvenpää (FI); Harri Jokinen, Hiisi (FI)

(73) Assignee: Nokia Corporation, Espoo (FI)

( * ) Notice: Subject to any disclaimer, the term of this patent is extended or adjusted under 35 U.S.C. 154(b) by 234 days.

(21) Appl. No.: 10/088,460

(22) PCT Filed: Sep. 19, 2000

(86) PCT No.: PCT/EP00/09206

§ 371 (c)(1),
(2), (4) Date: Aug. 29, 2002

(87) PCT Pub. No.: WO01/22759

PCT Pub. Date: Mar. 29, 2001

(30) Foreign Application Priority Data

Sep. 20, 1999 (GB) .................... 9922217.6

(51) Int. Cl.
*H04B 17/00* (2006.01)

(52) U.S. Cl. .................... 455/67.11; 455/422.1

(58) Field of Classification Search ........... 455/515, 455/226.1, 226.2, 226.3, 436, 439, 464, 446, 455/67.11, 422.1, 69, 522, 115.3, 524, 513, 455/429, 442, 443, 437
See application file for complete search history.

(56) References Cited

U.S. PATENT DOCUMENTS

| 5,594,949 A | 1/1997 | Andersson et al. ........... 455/62 |
| 5,966,657 A * | 10/1999 | Sporre ........................ 455/425 |
| 6,223,037 B1 * | 4/2001 | Parkkila ..................... 455/434 |
| 6,308,071 B1 * | 10/2001 | Kalev ......................... 455/446 |

FOREIGN PATENT DOCUMENTS

| EP | 0 920 143 A | 6/1999 |
| GB | 2 327 014 A | 1/1999 |
| WO | WO 99 05878 A | 1/1997 |

* cited by examiner

*Primary Examiner*—Edward F. Urban
*Assistant Examiner*—Tu X. Nguyen
(74) *Attorney, Agent, or Firm*—Cohen, Pontani, Lieberman & Pavane

(57) ABSTRACT

The present invention relates to reporting cell measurement results associated with a plurality of cells of a cellular communication system. The reporting is transmitted from a station via a radio interface to receiver element of a cell serving the station. The cells are arranged in a reporting order that is to be used by the station for the reporting. The cell measurements are performed by the transceiver station for getting cell measurement results associated with a number of the cells. Relevant cell measurement results are then selected and the selected results are transmitted in the defined reporting order.

30 Claims, 3 Drawing Sheets

| 8 | 7 | 6 | 5 | 4 | 3 | 2 | 1 | |
|---|---|---|---|---|---|---|---|---|
| | | | | | | | | octet 1 |
| Measurement Results 2 IEI | | | | | | | | Octet 2 |
| Serving cell and other measurement results (Not relevant) | | | | | | | | Octet 3 |
| | | | | | | | | Octet 4 |
| IND=1 | | | RXLEV-NCELL 1 | | | | | Octet 5 |
| RXLEV-NCELL 2 (low part) | | | | | | IND=1 | RXLEV-NCELL 3 (high part) | Octet 6 |
| RXLEV-NCELL 3 (low part) | | | | IND=1 | RXLEV-NCELL 4 (high part) | | | Octet 7 |
| RXLEV-NCELL 4 (low part) | | IND=0 | IND=0 | IND=0 | RXLEV-NCELL 5 (high part) | | | Octet 8 |
| RXLEV-NCELL 5 (low part) | IND=0 | IND=0 | IND=0 | IND=0 | IND=0 | IND=0 | IND=1 | Octet 9 |
| IND=0 | IND=0 | IND=0 | IND=0 | IND=0 | IND=1 | IND=0 | IND=0 | Octet 10 |
| IND=0 | IND=0 | IND=0 | IND=0 | IND=0 | IND=1 | RXLEV-NCELL24 (high part) | | Octet 11 |
| RXLEV-NCELL24 (low part) | | IND=1 | IND=1 | RXLEV-NCELL 25 (high part) | | | | Octet 12 |
| RXLEV-NCELL 25 (low part) | | IND=1 | RXLEV-NCELL 26 (high part) | | | | | Octet 13 |
| RXLEV-NCELL 26 (low part) | IND=1 | RXLEV-NCELL 27 (high part) | | | | | | Octet 14 |
| RXLEV-NCELL 27 (low part) | IND=1 | RXLEV-NCELL 28 | | | | | | Octet 15 |
| | | | RXLEV-NCELL 29 | | | | | |
| IND=0 | IND=1 | | RXLEV-NCELL 32 | | | | IND=0 | Octet 16 |
| | | | | | | | | Octet 17 |

FIG. 4

REPORTING CELL MEASUREMENT RESULTS IN A CELLULAR COMMUNICATION SYSTEM

PRIORITY CLAIM

This is a national stage of PCT application No. PCT/EP00/09206, filed on Sep. 19, 2000. Priority is claimed on that application, and on patent application No. 9922217.6 filed in Great Britain on Sep. 20, 1999.

FIELD OF THE INVENTION

The present invention relates to reporting in a cellular communication system, and in particular, but not exclusively, to reporting of measurement results from a transceiver station to the communication system.

BACKGROUND OF THE INVENTION

A wireless communication network may comprise a cellular radio network consisting of cells. In most cases a cell can be defined as a certain area covered by one or several base transceiver stations (BTS) serving mobile stations (MS) within the cell via a radio interface. The base station may be connected to a base station subsystem (BSS). Several cells may overlap and cover together a larger area, thereby forming the coverage area of a cellular radio network. The cell (or group of cells) and thus the mobile station (MS) or similar user equipment (UE) within one of the cells of the system can be controlled by a node providing controller functionality. Examples of the network controller include a base station controller (BSC), a radio network controller (RNC) and a mobile switching center (MSC), but other control nodes may also be used. The controller can be connected further to a gateway or linking node, for example a gateway GPRS support node (GGSN) or gateway mobile switching center (GMSC), linking the cell to the other parts of the communication system and/or other communication networks, such as to a PSTN (Public Switched Telecommunications Network) or to a data network, such as to a X.25 based network or to a TCP/IP (Transmission Control Protocol/Internet Protocol) based network. The cellular telecommunication networks typically operate in accordance with a given standard (or several standards) which sets out what the elements of the network are permitted to do and how that should be achieved. Examples of the cellular telecommunications network standards include code division multiple access (CDMA) based standards (such as the Digital Advanced Mobile Phone Service (DAMPS), or Wide-band CDMA or the proposed Universal Mobile Telecommunications System (UMTS) or time division multiple access (TDMA) based standards (such as GSM: Global Standard for Mobile or the GSM based General Packet Radio Service (GPRS)) or frequency division multiple access (FDMA) based standards. In addition to basic voice and data communication services, the users of the mobile stations are provided with various other services known to the skilled person.

The mobile station and/or the base station may measure and/or define several parameters concerning the conditions in the cell, such as signal levels (power) between the receiving and transmitting stations, quality of the signal, distance between the stations, amount of transmitted data and so on. The mobile station can be provided with appropriate means for defining a value for any parameter that can be measured for the interaction between the mobile station and any of the base stations or the conditions in a cell. The measurements or definitions performed by the mobile station will be referred to in the following as cell measurements and the results obtained by the mobile station will be correspondingly referred to as cell measurement results.

During an ongoing call the mobile station may report to the network controller so called neighbouring cell measurement results associated with cells neighbouring the cell serving the mobile station at the current moment by a measurement result message. In other words, the neighbouring cells can be defined to be the other cells of the system than the cell currently serving the mobile station. For example, in the GSM based systems the reporting may be done on SACCH (Slow Associated Control Channel). In this instance the measurement result message consists of information related to the serving cell and also information concerning the six strongest neighbouring cells. In the GSM based systems the report message frame includes information bits for the measured RX-level (received signal level), BCCH-frequency (Broadcast Control Channel frequency) and the BSIC (Base Station Identity Code) for each reported neighbouring cell. At the current GSM based systems the RX-level is reported with six bits. The value range of the information is set to be from −47 dBm to −10 dBm with 1 dB steps.

In the current measurement reports it is possible to report only six neighbouring cells in maximum. Since the number of the cells with which the mobile station may interact can be greater than this it could be advantageous to have a report covering more than only the six cells. This is especially the case in multisystem or multiband networks and/or in cellular communication systems operating in a multilayer environment. In general, the multimode systems can be defined as a communication environment in which the mobile station may be in a such service area where it may be served by more than one serving network or system or standard or frequency and so on. An example of a multiband system is a dual-band GSM mobile stations served by both 900 MHz and 1800 MHz frequencies. An example of a multisystem is a dual mode telephone operating e.g. in GSM networks and in UMTS networks.

For example, in the current GSM standard a reported neighbouring cell will reserve 17 bits from the reporting message. There is no free space in the current measurement report message to include more cell measurement results for the neighbouring cells than said measurement results for six neighbouring cells.

In addition, the reporting of the RX-level with 6 bits only may cause limitations in the reporting range in some applications. Especially, the maximum value of the indicated RX-level may be insufficient for all applications. Therefore it could be advantageous to be able to indicate RX-levels that are higher than the currently possible levels, such as the −47 dBm maximum value. Reports of higher received signal levels is needed e.g. for the purposes of handover decisions in instances where the mobile station is close to a sectored base station and moving from one sector to another sector of the base station.

Furthermore, at signal levels above e.g. −47 dBm value, the current measurement report cannot indicate if the serving cell has a higher power than one of the neighbouring cells unless the serving cell is included in a list of the neighbouring cells. This approach is, however, not a desired solution since the number of the real neighbouring cells reported to the network would go down from 6 to 5.

SUMMARY OF THE INVENTION

It is an aim of the embodiments of the present invention to address one or several of the above problems.

According to one aspect of the present invention, there is provided a method in a cellular communication system for reporting cell measurement results associated with cells of the system from a transceiver station via a radio interface between the transceiver station and a cell serving the transceiver station, comprising:

defining a reporting order of the cells to be used by the transceiver station for reporting;

performing cell measurements at the transceiver station for getting cell measurement results associated with at least some of the cells;

selecting relevant cell measurement results from the performed cell measurements; and reporting the cell measurement results from the transceiver station in the defined reporting order.

According to another aspect of the present invention there is provided a cellular communication system comprising:

a transceiver station;

a cell serving the transceiver station via a radio interface;

a plurality of further cells;

wherein the transceiver station comprises control means for performing cell measurements concerning at least some of the further cells, control means for defining a reporting order of the measurement results, control means for selecting relevant cell measurement results from the performed cell measurements, and control means for generating a report message reporting the cell measurement results in the defined reporting order.

According to another aspect of the present invention there is provided a mobile station for use in a cellular communication system comprising control means for performing cell measurements concerning cells of the system, control means for defining a reporting order of the measurement results, control means for selecting relevant cell measurement results from the performed cell measurements, and control means for generating a report message reporting the cell measurement results in the defined reporting order.

According to another aspect of the present invention there is provided a network node of a cellular communication system comprising means for receiving cell measurement results from a station communicating with one of the cells of the system, said measurement results being associated with a plurality of cells of the communication system and being reported from the station in a reporting order of the cells defined by the station, control means for defining the reporting order used by the station for the reporting and control means for attaching measurement results to cells based on the reporting order.

According to more specific embodiments, the measurement results are reported by information symbol strings containing a plurality of information symbols, wherein an indication symbol is included into the measurement report string for indicating whether the following predefined number of symbols in the string includes the cell measurement results of a subsequent cell in the reporting order of the cells or whether the subsequent cell will not be reported in the measurement report string. In addition, predefined information about the cells to the measured may be received at the mobile station, wherein the definition of the reporting order is based on said received information. The reported measurement results may be associated with respective cells at a control node of the cellular communication system.

The embodiments of the invention provide several advantages. By means of some of the embodiments it is possible to include cell measurement reports for a greater number of cells within a reporting message without increasing the length of the reporting message string. Some of the embodiments enable use of a greater number of information symbols for each of the reported cells without increasing the length of the reporting message or reducing the number of the cells reported by a single message. By means of this it is possible to increase the range of the reported measurements. In addition, in some embodiments it is not necessary to transmit an identification of the cell, such as information of the frequency of the broadcast channel and the base station identity, for each of the measured cells together with the results from the mobile station.

BRIEF DESCRIPTION OF DRAWINGS

For better understanding of the present invention, reference will now be made by way of example to the accompanying drawings in which:

FIG. 4 illustrates one example of coding of a report message in accordance with one embodiment of the present invention.

DESCRIPTION OF PREFERRED EMBODIMENTS OF THE INVENTION

Figure 1:
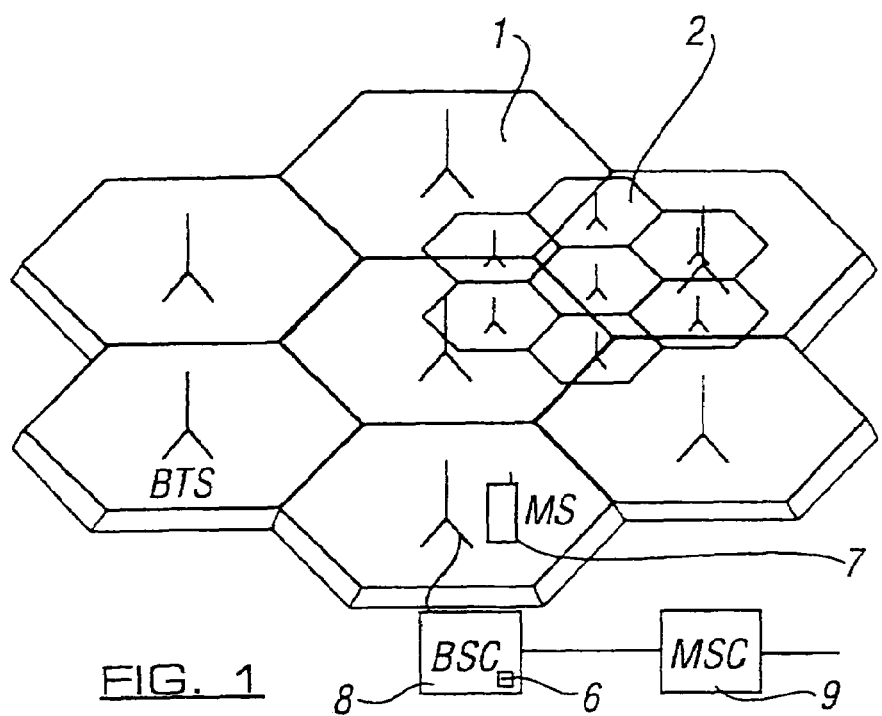
FIG. 1 shows a cellular radio system with which the embodiments of the present invention can be used.

Reference is made to FIG. 1 which shows a cellular system with which the embodiments of the present invention can be used. It is noted that even though the exemplifying telecommunications network shown and described in more detail in the following uses the terminology of a circuit switched GSM (Global System for Mobile communications) public land mobile network (PLMN), the proposed solution may be used in any cellular communication system. It should also be appreciated that the embodiments of the invention may be implemented using any number of cells. The radio coverage area of a cell may consist, for example, of a relatively omnidirectional pattern or a sector of a base station may be provided with a directional or sector antenna (not shown). The sector base station may use e.g. three 120° directional antennas whereby three radio coverage areas are provided, or four 90° directional antennas providing four radio coverage areas and so on, or any combinations of different radio coverage beam widths. It should also be appreciated that base stations may sometimes be referred to as node B (e.g. in the UMTS standard).

FIG. 1 illustrates two layers or cells 1 and 2, respectively. The arrangement may be, for example, such that the first layer of cells 1 belongs to a network based on a first standard and the second layer of cells 2 belongs to a network based on a second standard. Each of two each cell 1,2 is served by the respective base transceiver station BTS. Each base transceiver station BTS is arranged to transmit signals to and receive signals from the mobile station MS 7 in the cell. Likewise, the mobile station is able to transmit signals to and receive signals from the respective base transceiver station. The mobile station 7 accomplishes this via wireless or radio communication with the base stations. Typically a number of mobile stations will be communication with each base station although only one mobile station is shown in FIG. 1 for clarity.

Each of the base stations is connected to a network controller, which in one form of the exemplifying GSM system comprises a base station controller (BSC) 8 connected further to a Mobile Switching Center (MSC) 9. In the described embodiment the BSC is providing the network controller functionality for the purposes of the described embodiments. However, it is noted that the base station controller 8 controlling one or several base stations between the network controller and the base stations may be omitted in some embodiments. Therefore any other appropriate network element may be used for providing a controller functionality than can be used for processing measurement information from the mobile station 7. It is also noted that typically more than one network controller is provided in a network. The network controller is connected to other elements or parts of the telecommunications network system via a suitable linking or gateway apparatus, such as Gateway Mobile Switching Center (GMSC; not shown).

The implementation of the communication between the mobile station, the base station and the controller is known, and will thus not be discussed in more detail herein. It is sufficient to note that the interface may comprise channels in both uplink and downlink directions between the mobile station in the cell associated with a given base station and that the information sent to the mobile station and the data may be sent in any suitable format. The messages sent from the mobile stations may include information identifying the mobile station (for instance, MS ID and/or IMSI (mobile Station Identity and/or International Mobile Subscriber Identity, respectively)).

As disclosed by FIG. 1, the mobile station can be simultaneously in the signaling area of several cells. The mobile station is arranged to perform measurements, for example in order to be able to provide information based on which a suitable cell can be selected for serving the mobile station. In other words, in addition to controlling the ongoing connection with the servicing base station, the mobile station may perform measurements concerning the other cells as well.

It should be appreciated that this description uses the term neighbouring cell for defining any further cell that can be reached by a mobile station in a cell of the cellular communication system. That is, the cells need not to have any "border line" therebetween but the neighbouring cells or other cells may be partially overlapping, or even covering the entire coverage area of the servicing cell. In addition, the neighbouring cells may be cells of another type of communication network (e.g. networks based on different standards) or cells of a system using another frequency. The latter is the case when, for example, so called dual-band mobile stations are used.

Figure 3:
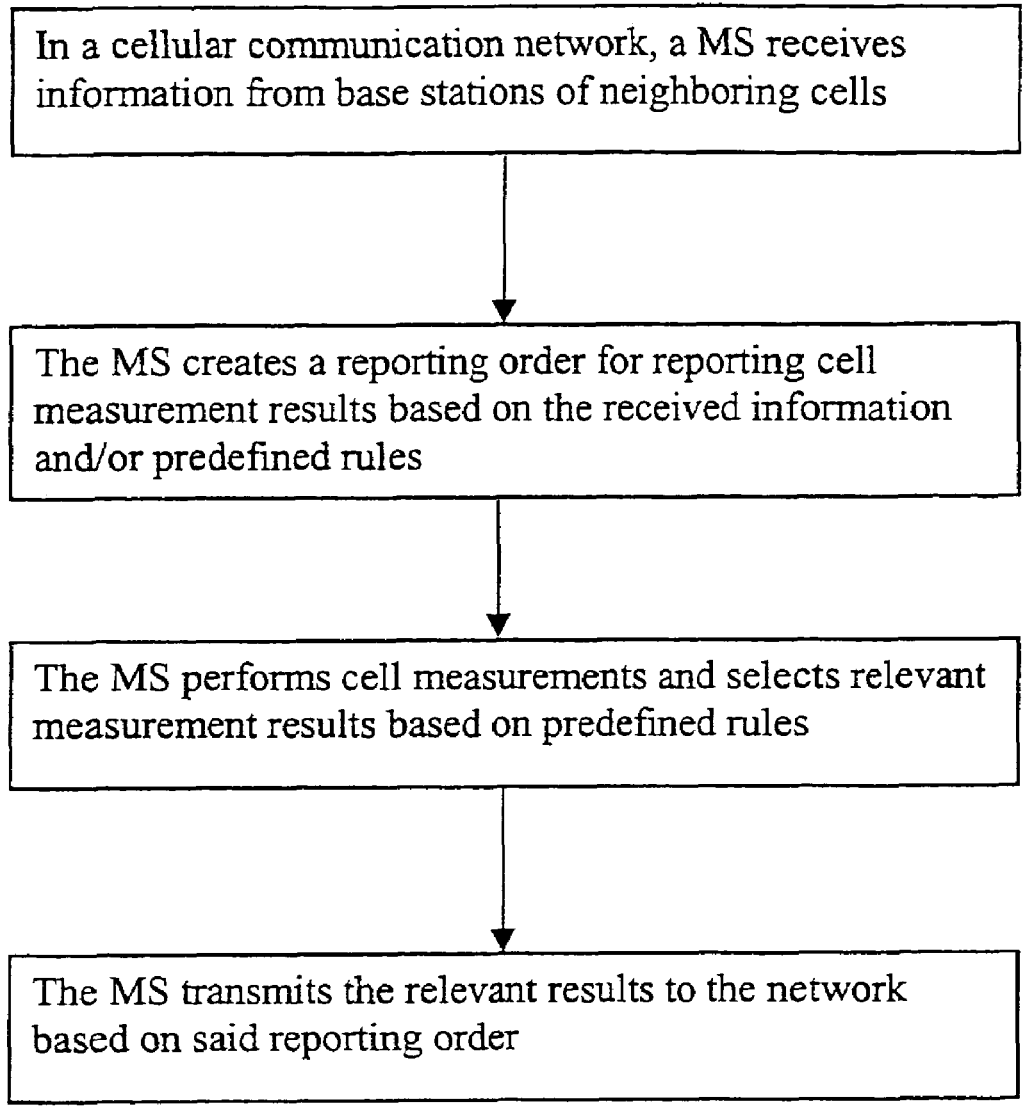
FIG. 3 is a flowchart illustrating the operation of one embodiment of the present invention.

FIG. 3 illustrates a flow chart for an embodiment for transmitting report messages from the mobile station. In the embodiment only such measurement results that associate to relevant neighbouring cells are reported to the network controller. According to a preferred embodiment this is accomplished without including any identification parameters of the related neighbour cells. The measurement results, such as RX-levels, are reported in a specific order of which the appropriate network controller, such as the BSC or RNC, is also made aware of.

Since the controller is aware of the reporting order, it is possible for it to conclude to which neighbouring cells the reported measurement results relate. Appropriate control or processing means 6 of the controller 8 of FIG. 1 for accomplishing this are known, and will thus not be explained in more detail. It is sufficient to note that the controller nose is arranged to receive the cell measurement results from the mobile station 7 and to define measurement result and cell pairs based on the reporting order such that a respective measurement results is associated with a respective cell.

According to one possibility the reporting order is defined in the protocols and/or standards used by the cellular communication system. According to another approach the mobile station provides the controller with information of the reporting rules for setting the cells in an order the mobile station is going to use when reporting the cell measurement results, e.g. the RX-levels of the respective base stations to the network. According to a further possibility the controller provides the mobile station with instructions concerning the reporting order to be used when reporting the cell measurement results. The mobile station may also receive an elsewhere prepared reporting order, and thereafter use the received order as such for the reporting. In this case the definition processing done by the mobile station is for defining that the received reporting order is to be used for the reporting. It is noted that the rules for setting the cells in order may be changed during the operation of the communication system. The change may be dynamic, e.g. the change may occur as response to a predefined event (e.g. a system failure, overload, peak hour conditions, night time conditions, and so on) detected or defined by the system.

This explicit reporting order of the neighbouring cells may be defined by the mobile station based on neighbouring cell BCCH (Broadcast Control Channel) frequencies (e.g. based on ARFCN: Absolute Radio Frequency Channel Number) and the BSICs (Base Transceiver Station Identity Code) of the neighbouring cells received at the mobile station from the network. As mentioned above, the appropriate controller in the radio network side is also aware of this reporting order of the cells. The mobile station proceeds the cell measurements and selects relevant neighbouring cell measurement results among the performed measurements. These selected relevant results are then transmitted to the network in the known reporting order. The controller defined based on the known reporting order those cells the respective reported results relate.

The selection of the relevant cells may be based on any appropriate predefined rule of selection. The rules may be defined in the standards the mobile station and/or the communication system is arranged to use. The rules may be stored permanently in the mobile station. According to one possibility the rules are stored in an appropriate network element and transmitted therefrom to the mobile station when ever required. As was the case with the rules for setting the cell in a predefined order, the rules for selecting relevant cells may also be changed when this is deemed necessary. The selection of the relevant cells may be based, with no limitation to the following, on the measured signaling levels, used radio frequencies, direction of the movement of the mobile station, loading conditions of the neighbouring cells and so on.

Figure 2:
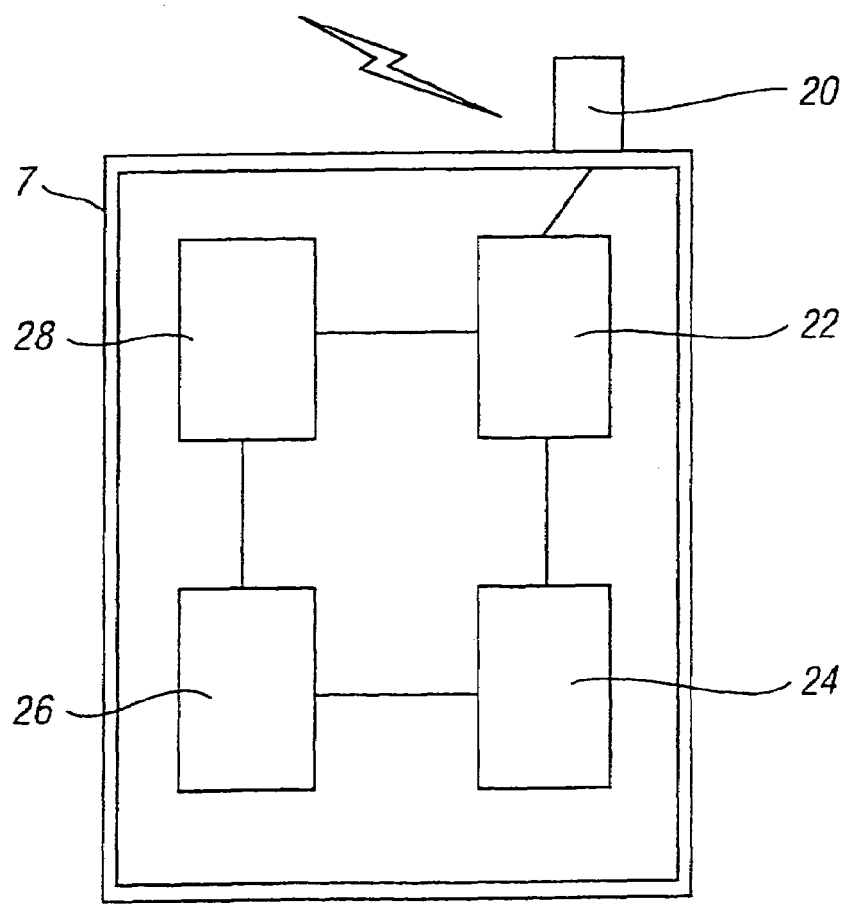
FIG. 2 is a schematic presentation of a mobile station constructed in accordance with the present invention.

FIG. 2 illustrates schematically a sectioned mobile station 7 which may be used in the embodiments of the invention. The mobile transceiver station comprises an antenna 20 for receiving and transmitting radio signals. The mobile station 7 comprises further control means 22 for performing various cell measurements associated with several base stations. In addition, control means 24 are provided for generating the reporting order of the measurement results. Control means 26 are provided for selecting the relevant ones of the performed cell measurements results. Control means 28 are provided for generating a report message reporting the relevant cell measurement results in the generated reporting order via the radio interface with the serving base station. It should be appreciated that the functions of the controllers 22 to 28 can be implemented by a single controller, or by two or three controllers or that said functions can be distributed to more than the four control units 22 to 28 of the mobile station 7.

A preferred embodiment for the transmission of the measurement results will now be described with reference to FIG. 4, wherein specific indication bits are used in the report messages transmitted from the mobile station to the network. More precisely, an indication bit can be used for each neighbouring cell measurement result indicating whether the following bit is a first bit of a relevant measurement result for a cell or a bit indicating a next neighbouring cell in the predefined reporting order. The latter may be the case e.g. when no measurement information is available for the preceding neighbouring cell and therefore the cell does not have any relevancy for the operation of the mobile station. However, the division between the relevant and non-relevant cells may be based in any other criteria as well. The bit indicating a non-relevant cell can be referred to as a skip bit.

From FIG. 4 it can be seen that the measured RX-level is reported for the cells which are in the reporting order list on places 1 to 5, 24 to 29 and 32. No cell measurement result information is reported for the neighbouring cells being in the places 6 to 24 and 30 to 31 in the reporting order.

According to one possibility, the order of the bits for measurement results and the indication bits is such that the first bits of the measurement report string indicate only what cells are reported. The following bits will then include the information of the results. E.g. in the exemplifying system of enabling 32 neighbouring cell, the first 32 bit may be arranged such that the "1" indicates that the cell is reported. "0" would then indicate that the cell is not reported. After the first 32 bits, the following information bits or other information symbols in the string inform in the reporting order the results for those cells that were indicated by "1".

Since the cells to which the cell measurement results relate can be identified by the reporting order used in the measurement report, no additional bits are required for the cell identification. Therefore more neighbouring cells can be added to the measurement report. For example, if the number of bits reserved for a cell to be reported is seven bits, this is ten bits less than the number of bits reserved by the current solution in the GSM for reporting one neighbour cell. As the non-relevant neighbouring cells are also included in the reporting order of the measurement results, the non-relevant cells have to be indicated in the measurement report. However, the number of bits reserved for a non-relevant neighbouring cell (i.e. not reported cell) may be only one bit, as will be explained later on in this specification.

According to a more specific example of the embodiment, the network may transmit the neighbouring cell BCCH frequencies (e.g. the ARFCN values) in System Information 5 (SI 5), System Information 5bis and System Information 5ter messages based on GSM Specification 04.18 version 8.0.0. The BSICs of the neighbouring cells are transmitted to the mobile station in a message indicating the identity of the transmitting station. This may be a new message or then a message encapsulated to another message which the mobile station may receive. According to one option the identity indication message replaces the SI 5 messages and contains both the BCCH frequencies as well as the BSICs.

According to an embodiment the mobile station sets all the neighbouring cells in an explicit reporting order based on the above described two parameters. The reporting order is also known by the network. It is noted that each BCCH frequency may have more than one associated BSIC. After the above information has been received, each of the neighbouring cells can be identified with a unique BSIC/BCCH ARFCN pair and the neighbouring cells can be put into an explicit order according to the data in the relevant system information messages.

The total number of neighbouring cells can be limited to correspond the mobile station measurement capabilities. According to an embodiment the number of cells is 32, which is the maximum number of neighbouring cells at the current network architectures. However, this is only an example, and the number of neighbouring cells can be smaller or greater than 32.

In the measurement report the RX-levels of the relevant neighbouring cells are reported using this specific order. The measurement report includes an indication bit for each neighbouring cell. By the indication bit it may be indicated whether the following bits (for example, the following 6 bits) describe the RX-level of that specific neighbouring cell or not. For example, the arrangement may be such that an indication bit value "1" means that the RX-level is included and an indication bit value "0" means that no RX-level is not included for the given cell. If no RX-level is available the bit followed the current indication bit will then be the indication bit for the next neighbouring cell in the reporting order.

The embodiments of the invention enable an arrangement where it is not necessary to associate a BSIC and an index to each individual measurement result, thereby saving a lot of space in the report message. The BSIC is not required since the BSIC/BCCH frequency information is transmitted to the mobile station and the mobile station may decide which measurements are valid i.e. relevant and such which need to be reported. In the current systems this is done at the base station controller. The index is not required and can thus be removed from the report. The mapping of the RX-level or any other measurement result to the corresponding cell is based on the order of the results instead of any indexes.

Since the embodiment makes it possible with to leave the BSIC and BCCH-frequency of each neighbour cell out from the measurement report message and thereby enables inclusion of measurement results (e.g. the received signal level) of a greater number of neighbour cells. The report includes only the RX-level of the reported neighbour cells and the indication bit, an no other parameters are required to identify the cells in the report message. In the GSM example described above this means that since 107 bits reserved for neighbour cell measurement results can be used so that only seven bits are used for a cell with measurement result and one bit is used for a cell without any (or with a non-relevant) measurement result. For example, all cells can be reported in a cell having 32 neighbours such that the report includes measurement results for seven neighbouring cells (12×7+ 20×1=104 bits). This leaves even 3 bits free for other reporting purposes.

According to a measurement report message that is based on the GSM standards, there can be 13 octets and 3 additional bits available for neighbouring cell reporting, thereby providing 8×13+3=107 bits long reporting string or frame. At the current systems one cell can have a maximum of 32 neighbouring cells. The RX-level reporting reserves seven bits for a relevant neighbouring cell and one bit for a non-relevant neighbouring cell. In the case all neighbouring cells can be measured, the 15 first neighbouring cells on the list can be reported. If no limitations is set to the placing of the cells in the reporting order list, the maximum number of cells would be 12. In this instance the number of the reported neighbouring cells can be doubled from the above by means of the embodiments of the present invention.

The reported signal levels may be indicated with relation to a certain predefined reference signal level. The reference signal level may be transmitted in the same measurement report message. The reference signal level is preferably set so that each of the relevant signal levels can be reported by means of the reference level. More precisely, a reference level for the signal level is transmitted e.g. with three bits, with 4 dB steps (for example, 0=−110 dBm, 1=−106 dBm, 2=−102 dBm). Each measured signal level from the serving cell and from the relevant neighbouring cells are then indicated in the report in relation to this reference signal level. The reference signal level may be chosen so that each reported signal level is explicitly stronger or weaker than the reference signal level.

The following is presented in order to further clarify the scaling of the frame. The reference signal level may be indicated with three bits, thereby offering eight different values. Six bits are reserved for the indication of the relation between the measured result and the reference value. This makes it possible to have up to 63 dB dynamics in the signal level reporting. If the difference from the reference level is indicated with five bits, then dynamic would be up to 31 dB, which may also be sufficient for several applications. The five bit indication would save one further bit per reported neighbouring cell when compared to the received signal level reporting used in some of the current cellular systems.

Using reference level and indicating the difference from this reference level it is possible to widen the reporting range from −48 dBm to stronger signal levels. The stronger (i.e higher or greater) signal levels are levels >−48 dBm, such as −47 dBm, −40 dBm or −30 dBm.

The enhanced cell measurement reporting discussed above can be readily supported by "new" mobiles stations comprising the required control hardware and/or software, as illustrated by FIG. 2. It is, however, preferred that the embodiment are used under control of an appropriate network element or elements. This guarantees compatibility between the "new" mobiles stations supporting the embodiments of the invention and "old" network implementations that cannot handle the described new reporting mode. If the neighbouring cell frequencies are sent with current system information messages while the BSIC information is sent in separate messages, the mobile station may send measurement reports with the "old" report after a handover until the mobile station is ordered to use the new report mode, e.g. as a result of receiving the message indicating the BSICs. By means of this it is possible to minimize the gap in neighbouring cell reporting after a handover, since the information of neighbouring cell frequencies can be received before the full information required for the new reporting format. The old reporting format needs to be used until it is known that the new cell supports the new reporting format. Alternatively the reporting mode after the handover is controlled by a corresponding new indicator in the handover command.

It should be appreciated that whilst embodiments of the present invention have been described in relation to mobile stations, embodiments of the present invention are applicable to any other suitable type of user equipment. In addition, while a message containing information bits and an indication bit are discussed above, the embodiments may be implemented by using any appropriate information symbols.

It is also noted herein that while the above describes exemplifying embodiments of the invention, there are several variations and modifications which may be made to the disclosed solution without departing from the scope of the present invention as defined in the appended claims.

What is claimed is:

1. A method in a cellular communication system for reporting cell measurement results associated with cells of the system from a transceiver station via a radio interface between the transceiver station and a cell serving the transceiver station, comprising:
    defining a reporting sequence of the cells to be used by the transceiver station for reporting;
    performing cell measurements at the transceiver station for getting cell measurement results associated with at least some of the cells;
    selecting relevant cell measurement results from the performed cell measurements; and
    reporting the cell measurement results from the transceiver station in the defined reporting sequence without including any identification parameters of the cells.

2. A method according to claim 1, wherein the measurement results are reported by information symbol strings containing a plurality of information symbols, the method further comprising a step of including an indication symbol into the measurement report string for indicating whether the following predefined number of symbols in the string includes the cell measurement results of a subsequent cell in the reporting sequence of the cells or whether the subsequent cell will not be reported in the measurement report string.

3. A method according to claim 2, wherein, in the event that the cell measurement indication symbol indicates that it will not be followed by symbols reporting the measurement results, the following symbol included in the measurement report string is a further indication symbol designated for a cell following the subsequent cell in the reporting sequence of the cells.

4. A method according to claim 1, comprising further steps of receiving predefined information about the cells to be measured at the mobile station, and defining the reporting sequence based on said received information.

5. A method according to claim 4, wherein said information comprises frequency of a broadcasting control channel and the identity of a transmitting base station of the cell to be measured.

6. A method according to claim 4, wherein at least part of the information is transmitted in a separate message via the broadcasting control channel.

7. A method according to claim 1, further comprising a step of associating each of the reported measurement results with respective cells at a control node of the cellular communication system.

8. A method according to claim 1, wherein the reported cell measurement result for a cell comprises signal level of a radio signal received at the transceiver station.

9. A method according to claim 1, wherein the reporting sequence is defined and the cell measurements are performed at the transceiver station for cells other than the serving cell.

10. A method according to claim 1, wherein the reporting sequence is based on the information received from the serving cell.

11. A method according to claim 1, wherein rules for defining the reporting sequence are stored at the transceiver station.

12. A method according to claim 1, comprising a step of transmitting rules for the reporting sequence to the transceiver station via the radio interface.

13. A method according to claim 1, comprising a step of changing rules for defining the reporting sequence.

14. A method according to claim 1, wherein rules for selecting the relevant other cells are stored at the transceiver station.

15. A method according to claim 1, comprising a step of transmitting rules for the selection of relevant cells to the transceiver station via the radio interface.

16. A method according to claim 1, comprising a step of changing the rules for the selection of the relevant cells.

17. A method according to claim 1, wherein the transceiver station sends the communication system information of the rules used for generating the cell measurement report.

18. A method according to claim 1, wherein the reported information of the cell measurement results is based on reference values.

19. A method according to claim 18 in conjunction with claim 8, wherein the reported information indicates if the measured signal level is stronger or weaker than the reference value.

20. A cellular communication system comprising:
a transceiver station;
a cell serving the transceiver station via a radio interface;
a plurality of further cells;
wherein the transceiver station comprises control means for performing cell measurements concerning at least some of the further cells, control means for defining a reporting sequence of the measurement results, control means for selecting relevant cell measurement results from the performed cell measurements, and control means for generating a report message reporting the cell measurement results in the defined reporting sequence without including any identification parameters of the cells.

21. A cellular communication system according to claim 20, comprising at least two different cellular network arrangements.

22. A cellular communication system according to claim 20, wherein the report message contains information symbols and at least one indication symbol in a string, said indication symbol indicating whether the following predefined number of symbols in the string define the cell measurement results of a subsequent cell in the reporting sequence of the cells or whether the subsequent cell will not be reported in the string.

23. A cellular communication system according to claim 22, wherein, in the event that the cell measurement indication symbol is for indicating that it will not be followed by symbols reporting the measurement results, the following symbol in the measurement report string is a further indication symbol designated for a cell following the subsequent cell in the reporting sequence of the cells.

24. A cellular communication system according to claim 20, wherein the transceiver station is arranged to receive predefined information associated with at least some of the further cells for use in defining the reporting sequence of the further cells.

25. A cellular communication system according to claim 24, wherein the information comprises the frequency of a broadcasting control channel and the identity of a transmitting base station of the cell to be measured.

26. A cellular communication system according to claim 20, further comprising a control node including means for associating measurement results with corresponding cells based on the reporting sequence.

27. A mobile station for use in a cellular communication system comprising control means for performing cell measurements concerning cells of the system, control means for defining a reporting sequence of the measurement results, control means for selecting relevant cell measurement results from the performed cell measurements, and control means for generating a report message reporting the cell measurement results in the defined reporting sequence without including any identification parameters of the cells.

28. A mobile station according to claim 27, said mobile station being arranged to operate in at least two different cellular network systems.

29. A mobile station according to claim 27 being further arranged to receive predefined information associated with at least some of the further cells for use in defining the reporting sequence of the further cells.

30. A network node of a cellular communication system comprising means for receiving cell measurement results from a station communicating with one of the cells of the system, said measurement results being associated with a plurality of cells of the communication system and being reported from the station in a reporting sequence of the cells defined by the station, control means for defining the reporting order used by the station for the reporting and control means for attaching measurement results to cells based on the reporting sequence without including any identification parameters of the cells.

* * * * *